United States Patent
Swanson et al.

(10) Patent No.: US 7,098,557 B2
(45) Date of Patent: Aug. 29, 2006

(54) CONSTANT VOLTAGE DISCHARGE DEVICE

(75) Inventors: Cal Swanson, Apex, NC (US); Vincent Himpe, Kampenhout (BE)

(73) Assignee: STMicroelectronics, Inc., Carrollton, TX (US)

( * ) Notice: Subject to any disclaimer, the term of this patent is extended or adjusted under 35 U.S.C. 154(b) by 210 days.

(21) Appl. No.: 10/440,074

(22) Filed: May 15, 2003

(65) Prior Publication Data
US 2004/0227494 A1 Nov. 18, 2004

(51) Int. Cl.
H02J 9/04 (2006.01)
(52) U.S. Cl. .......................... 307/66; 307/46
(58) Field of Classification Search ............... 320/128, 320/138, 140, 141, 145, 166, 167; 323/266; 307/44–46, 64, 66
See application file for complete search history.

(56) References Cited

U.S. PATENT DOCUMENTS

| | | | |
|---|---|---|---|
| 4,618,812 A * | 10/1986 | Kawakami | ............... 323/224 |
| 5,347,164 A * | 9/1994 | Yeh | ............... 307/66 |
| 5,714,863 A * | 2/1998 | Hwang et al. | ............... 320/166 |
| 5,790,391 A * | 8/1998 | Stich et al. | ............... 363/24 |
| 5,796,182 A * | 8/1998 | Martin | ............... 307/66 |
| 5,818,125 A * | 10/1998 | Manchester | ............... 307/66 |
| 5,862,046 A | 1/1999 | Farine et al. | |
| 5,880,611 A | 3/1999 | Danstrom | |
| 5,959,477 A | 9/1999 | Chung | |
| 6,069,574 A | 5/2000 | Eo et al. | |
| 6,072,732 A | 6/2000 | McClure | |
| 6,157,579 A | 12/2000 | Micheloni et al. | |
| 6,236,249 B1 | 5/2001 | Choi et al. | |
| 6,363,025 B1 | 3/2002 | McLaury | |
| 6,377,090 B1 | 4/2002 | Bruno | |
| 6,462,507 B1 * | 10/2002 | Fisher, Jr. | ............... 320/101 |
| 6,798,177 B1 * | 9/2004 | Liu et al. | ............... 323/222 |
| 2001/0054921 A1 | 12/2001 | Akiyoshi | |
| 2002/0063589 A1 | 5/2002 | Nguyen | |
| 2001/0075745 | 6/2002 | McLaury | |
| 2002/0089860 A1 | 7/2002 | Kashima et al. | |
| 2002/0140439 A1 | 10/2002 | Enam et al. | |
| 2002/0140689 A1 | 10/2002 | Huang et al. | |
| 2002/0145454 A1 | 10/2002 | Jensen | |

FOREIGN PATENT DOCUMENTS

| | | |
|---|---|---|
| EP | 0 183 597 A | 6/1986 |
| WO | WO 99/44269 A | 9/1999 |
| WO | WO 01/93404 A1 | 12/2001 |

* cited by examiner

Primary Examiner—Gary L Laxton
(74) Attorney, Agent, or Firm—Lisa K. Jorgenson; William J. Kubida

(57) ABSTRACT

Circuits and methods for supplying a temporary power supply at a predetermined voltage are disclosed. A circuit includes first DC/DC voltage that receives an input from a power supply at a first voltage level and generates an output at a second voltage level, higher than the first voltage level. The output is provided to charge a capacitor. A second DC/DC voltage converter has an input connected to the capacitor for drawing power from the capacitor at the second voltage level and an generates an output voltage less than the second voltage level. The second DC/DC voltage converter further includes a feedback input that monitors the circuit's output voltage and activates the second DC/DC voltage converter when the output voltage falls below a predetermined threshold.

13 Claims, 3 Drawing Sheets

CONSTANT VOLTAGE DISCHARGE DEVICE

BACKGROUND

1. Field of the Invention

The present invention relates to electronic circuits, and more particularly to an electronic circuit arrangement for supplying a constant voltage supply to an operating circuit for a period of time after power to the operating circuit has been lost.

2. Background

Numerous electronic devices implement a shut-down procedure upon loss of power to the device. To execute the shut-down procedures, electrical circuits in the device must continue to receive power after the device has lost power.

By way of example, Telecommunications standard ITU 992.1 requires that a series of "Dying Gasp" messages be sent by the ADSL Customer Premises modem through the data connection to the Central Office modem upon loss of power. Therefore, an ADSL modem requires a source of uninterruptable power to maintain an existing ADSL modem connection for up to 50 milliseconds after input power is lost, in order to complete the transmission of "Dying Gasp" messages. There is no further need to maintain power to the modem once the "Dying Gasp" messages are sent.

Accordingly, there remains a need in the art for short-term uninterruptible power supplies for use with electronic devices.

SUMMARY

In an exemplary embodiment, a constant voltage discharge device is provided. The constant voltage discharge device comprises means for receiving electrical current at a first voltage level; means for charging a capacitor to a second voltage level, higher than the first voltage level; means for discharging the storage capacitor in response to a predetermined condition to generate an output current; and means for decreasing the output voltage level.

In another embodiment, a method for supplying a constant discharge voltage is provided. The method comprises receiving an electrical current at a first voltage level; charging a capacitor to a second voltage level, higher than the first voltage level; discharging the storage capacitor in response to a predetermined condition to generate an output current; and decreasing the output voltage level.

In another embodiment, a first circuit for supplying power to a second circuit is provided. The first circuit comprises a first DC/DC voltage converter having an input connected to a power supply for receiving an electrical current at first voltage and converting the electrical current to a second voltage, greater than the first voltage; a capacitor connected to an output of the first DC/DC voltage converter for storing energy at the second voltage level; and a second DC/DC voltage converter having an input connected to the capacitor for discharging energy from the capacitor and generating an output having a voltage level less than the second voltage level.

DETAILED DESCRIPTION

The USB bus standard provides a source of up to 500 ma at between 4.75V and 5.25V for a bus-powered device. At 5 volts, a USB ADSL modem uses about 400 ma of the available current to provide power to the ADSL modem through several DC/DC converters and voltage regulators. Assuming a modem operates normally as long as the input remains at 3.8V or more (constrained by the supply requirements of the 3.3V DC/DC power supply), the minimum amount of reserve energy required to support "Dying Gasp" upon loss of power is: 5 Volts*0.4 Amps*0.05 sec=0.10 Joules. The following calculations show that a 30,000 uF capacitor can store sufficient energy to support modem operations over the discharge range from 4.75V to 3.8V, but it is not a very efficient use of storage.

$$E = \frac{1}{2}CV^2$$

$$E_{total} = 0.5 * 0.03 * (4.75)^2 = .338 \text{ J}$$

$$E_{used} = 0.5 * 0.03 * [(4.75)^2 - (3.8)^2] = .122 \text{ J}$$

$$E_{used} \% = 100\% * E_{used} / E_{total} = 36\%$$

More of the capacitor's energy store could be used if the discharge voltage range were increased. This may be achieved by first boosting the input voltage, but the inefficiencies generated by first boosting the input then bucking it for all supplies results in a large power loss which could cause a modem to exceed the 500 ma limit set by the USB standard.

Figure 1:
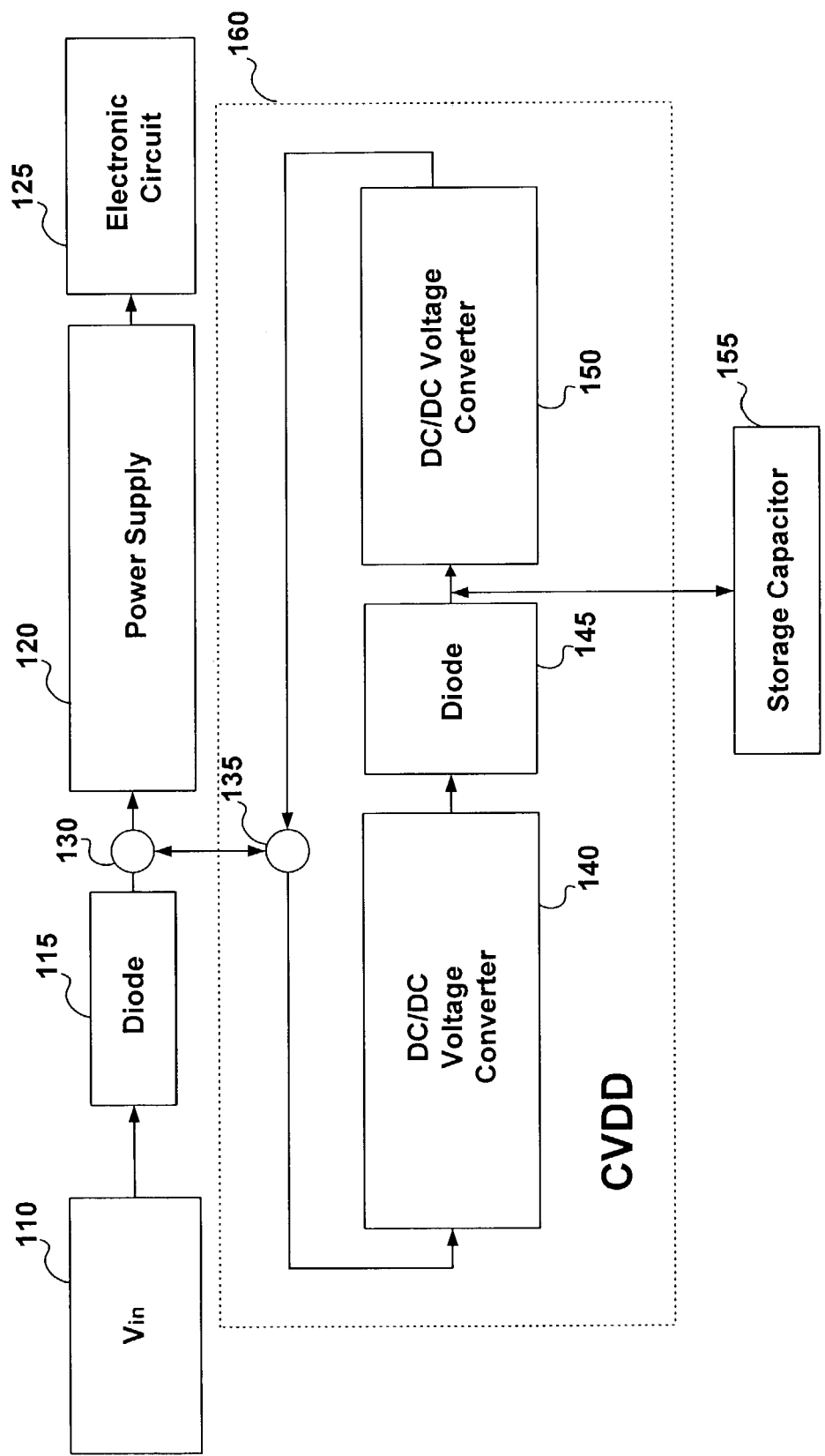
FIG. 1 is a block diagram illustrating an exemplary embodiment of a constant voltage discharge device.

Alternatively, the voltage may be boosted just on the storage capacitor so that the inefficiencies would be limited to charging and maintaining the energy reservoir. FIG. 1 is a block diagram illustrating an exemplary embodiment of a constant voltage discharge device. Referring now to FIG. 1, assume a power source 110 supplies power at a voltage of 4.75V to 5.25V. The current passes through a diode 115 to a power supply 120 which, in turn, provides power to an electronic circuit 125. Electronic circuit 125 may be embodied as any electronic device. In one exemplary embodiment, electronic circuit may be an ADSL modem.

In the exemplary embodiment depicted in FIG. 1, a constant voltage discharge device (CVDD) may be placed in an electrical path between a node 130 connected to the power supply and a storage capacitor 155. The CVDD may include a first DC/DC voltage converter 140 to step up the voltage, a diode 145, and a second DC/DC voltage converter 150 to step down the voltage.

In operation, input power is passed through the bypass diode 115 to the modem power supply for normal operation of the electronic circuit. As long as the supply voltage is above a predetermined threshold, the second DC/DC voltage converter 150 (i.e., the step-down converter) remains off while the first DC/DC voltage converter 140 (i.e., the step-up converter) siphons off a fraction of the input power to boost the voltage and trickle charge storage capacitor 155 through diode 145. The charging current may be limited to reduce the impact of the circuit on the input source current and charge the capacitor to an acceptable level (e.g., 95%) within an acceptable time frame.

When the input power fails or shorts, the first DC/DC voltage converter 140 turns off, and the second DC/DC voltage converter 150 switches on, draining the storage capacitor 155 to generate a voltage to the modem power supply below the turn-on threshold of the boost converter 140. The second DC/DC voltage converter 150 ceases to work when the storage capacitor 155 is discharged below its required input voltage. Boosting the voltage of storage capacitor 155 enables the use of a much smaller capacitor. For example, compared to the calculations above, calculations show that a 25V, 470 uF capacitor can replace a 5V, 30,000 uF capacitor as an equivalent storage device when the useful discharge range is changed to between 23V and 4.4V:

$$E = \frac{1}{2}CV^2$$
$$E_{total} = 0.5 * 0.00047 * (23)^2 = .124 \text{ J}$$
$$E_{used} = 0.5 * 0.00047 * [(23)^2 - (4.4)^2] = .120 \text{ J}$$
$$E_{used}\% = 100\% * E_{used} / E_{total} = 96\%$$

Figure 2:
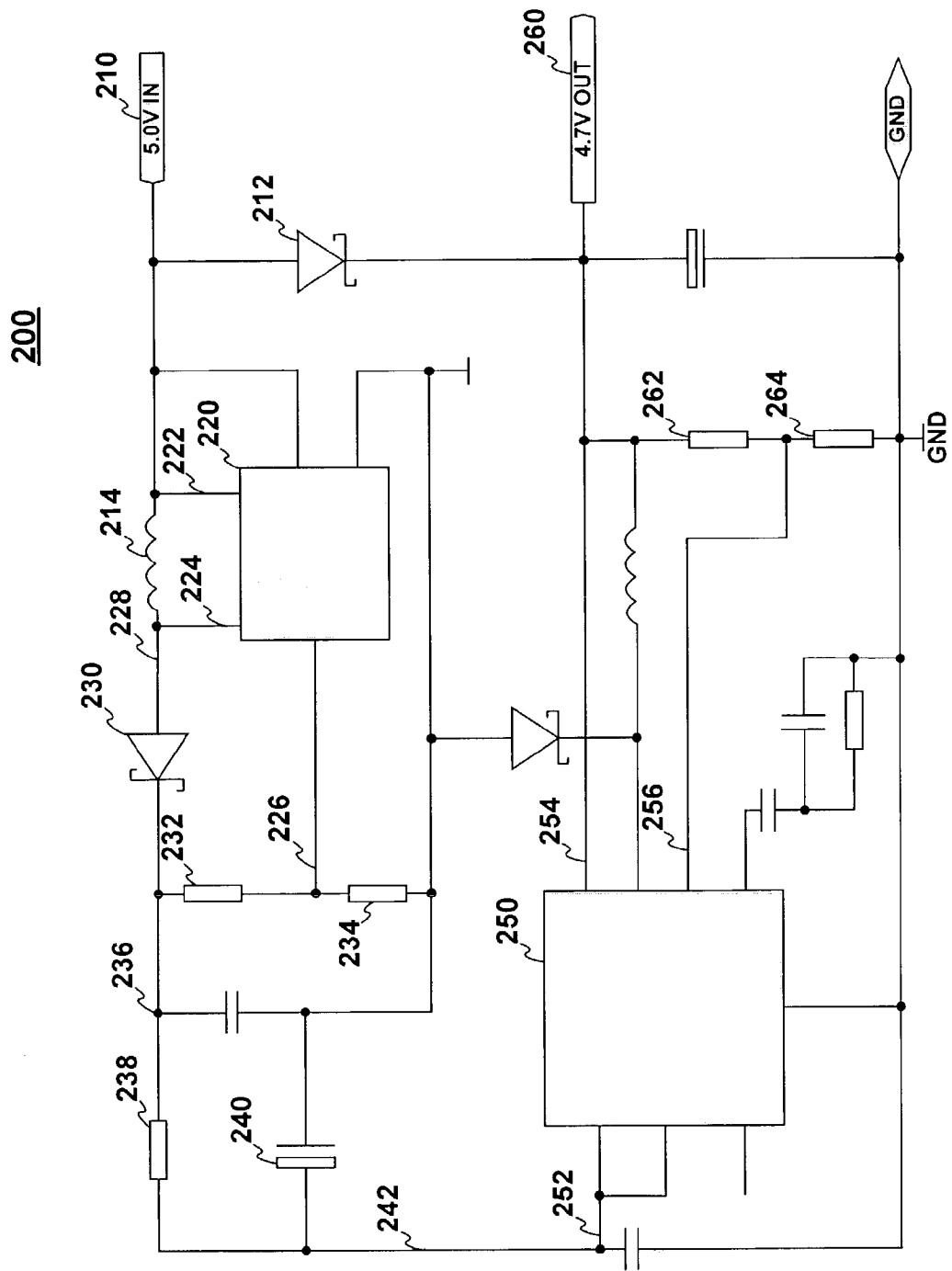
FIG. 2 is a circuit diagram of an exemplary embodiment of a constant voltage discharge device.

FIG. 2 is a circuit diagram of an exemplary embodiment of a CVDD 200 adapted to boost a 5V input 210 to 22.5 V, which is stored on capacitor 240 for subsequent discharge. It will be appreciated that the embodiment depicted in FIG. 2 is presented by way of example, and not by limitation. For clarity, only pertinent portions of circuit 200 are described in detail. Referring to FIG. 2, CVDD 200 includes a first DC/DC voltage converter 220 connected to input 210. The particular design of first DC/DC voltage converter 220 is not critical to the invention. An exemplary DC/DC voltage converter is an LT1930 commercially available from Linear Technology, Inc. of Milpitas, CA.

First DC/DC voltage converter 220 includes an input pin 222 connected to input line 210 and an output pin 224 connected to line 228. A flyback inductor 214 may be placed in the electrical path between input 222 and output 224. First DC/DC voltage converter 220 also includes a feedback pin 226 that monitors the voltage at a node between resistor 232 and resistor 234 and inhibits first DC/DC voltage converter 220 if the voltage exceeds a predetermined threshold. An oscillator closes a switch between line 224 and ground 270 within chip 220 allowing current to flow from 210 to ground through inductor 214. When the oscillator alternately opens the path from 224 to ground 270, the voltage across the inductor rises in an attempt to maintain the current. As the voltage at node 228 exceeds the voltage at 236 (plus a diode drop) the diode 230 then conducts current through a limiting resistor 238 to charge the storage capacitor 240. Diode 230 also blocks reverse current when the internal oscillator of the chip 220 enables the path to ground. The feedback path 226 monitors the voltage at node 236 through the resistor pair 232 and 234 and inhibits the switching when 22.5 volts is present at node 236.

It will be appreciated that the particular values of resistors 234, 236, 238, inductor 214, and storage capacitor 240 are matters of design choice. In an exemplary embodiment, resistors 234, 238 are 1K resistors, resistor 236 is a 21 K resistor, inductor 214 is a 10 μH inductor, and capacitor 240 is a 470 μF, 25V capacitor. One of skill in the art could select appropriate resistors and capacitors for circuit 200.

CVDD 200 also includes a second DC/DC voltage converter 250 that drains capacitor 240, stepping the voltage down to a predetermined output voltage, e.g., 5 V. The particular design of second DC/DC voltage converter 250 is not critical to the invention. An exemplary DC/DC voltage converter is an LT1676 commercially available from Linear Technology, Inc. of Milpitas, Calf.

In relevant part, second DC/DC voltage converter 250 receives an input 252 from line 242 that is connected to capacitor 240 and an output 254 that provides the output of circuit 200. A feedback pin 256 monitors the output voltage 260 through the resistor divider network consisting of resistors 262 and 264, and activates the voltage converter 250 if the voltage at feedback pin 256 drops below a predetermined threshold, e.g. 4.7 V.

It will be appreciated that the particular values of resistors 262 and 264 are matters of design choice. In an exemplary embodiment, resistor 262 is a 33K resistor and resistor 264 is a 12K resistor. One of skill in the art could select appropriate resistors 262, 264 for a desired activation voltage.

In operation, assuming 5 volts is present at input 210, the output voltage 260 is about 4.7V, i.e., the input voltage less the voltage drop across diode D1, which is about 0.3V. First DC/DC voltage converter 220 activates to generate an increasing output voltage, which charges storage capacitor 240 through the current-limiting resistor 238. Excluding any output loading, the maximum input current of the CVDD may draw less than 10 milliamps. This will charge storage capacitor 240 until the voltage drop across resistors 232, 234 exceeds a predetermined threshold, in this case 22.5V, at which point the first DC/DC voltage converter deactivates. At this point, the circuit requires only an idle current, e.g., a couple milliamps as referenced to the input, to power the circuit and maintain the energy reservoir.

The second DC/DC voltage converter 250 remains off until the voltage at feedback pin 256 falls below a predetermined threshold, e.g., 1.2 volts. If the input power is lost or removed or the voltage at node 260 becomes too low, then the second DC/DC voltage converter 250 activates to provide the required output voltage by draining storage capacitor 240 until the storage capacitor energy is drained below the voltage necessary to sustain the second DC/DC voltage converter 250. In this way, circuit 220 provides a temporary uninterruptible power supply on output node 260.

One of skill in the art will appreciate that the transition from input power to reserve power is smoothed when the voltage output of the second DC/DC voltage converter 250 is slightly below the voltage at 260 when input voltage at node 210 is present. Also, diodes 212 and 230 prevent current from flowing back into the input 210, so that even under input short circuit conditions, the energy reserve is only sent to the output load.

It will be apparent to one of skill in the art that circuit 200 provides a means for receiving electrical current at a first voltage level and for charging a capacitor to a second voltage level, higher than the first voltage level, i.e., the first DC/DC converter imposed between a power supply and a storage capacitor. In addition, circuit 200 provides a means for discharging a capacitor in response to a predetermined condition, i.e., the second DC/DC converter connected to the storage capacitor and configured to discharge the capacitor when the voltage at the output node drops beneath a predetermined threshold.

Figure 3:
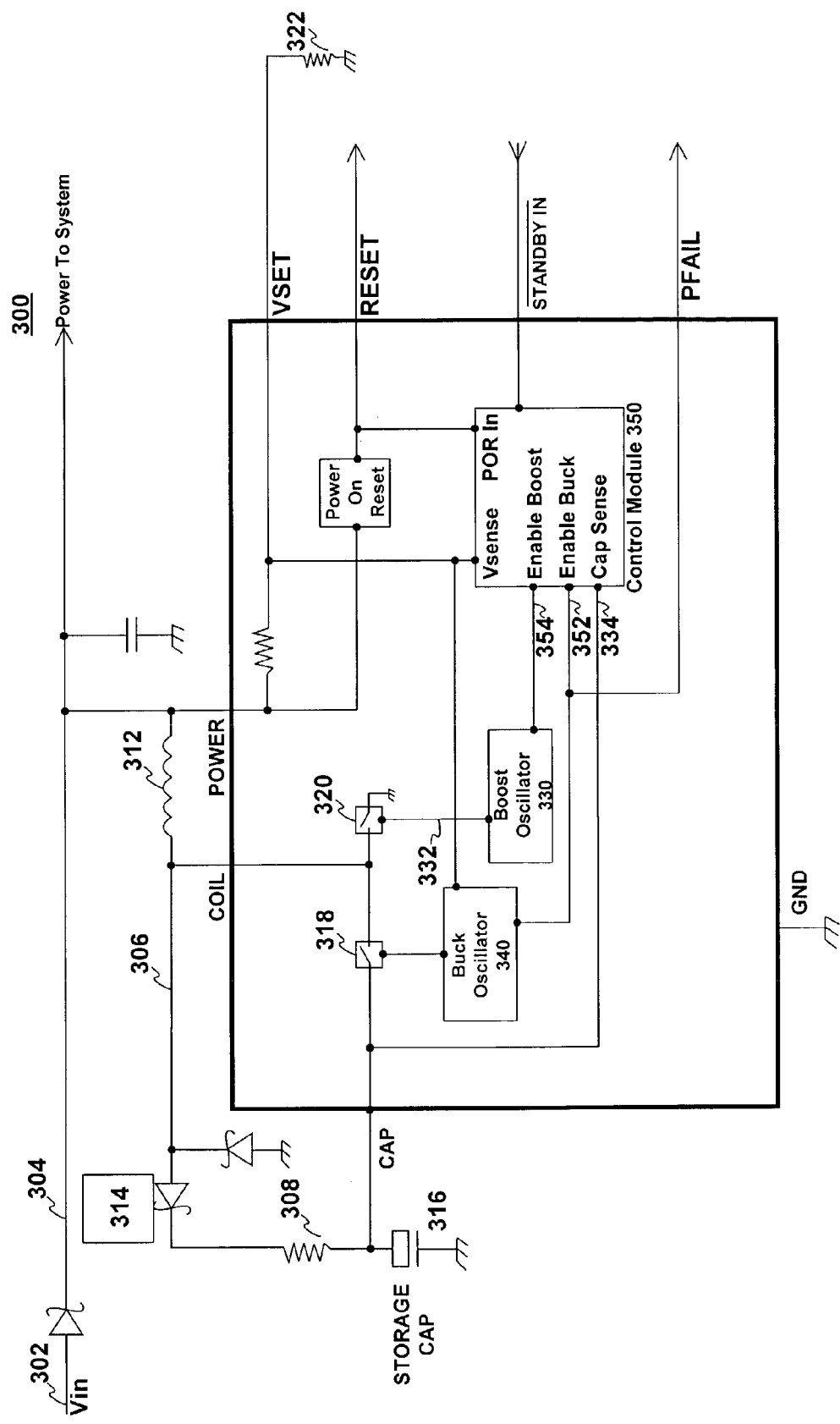
FIG. 3 is a schematic depiction of an alternate embodiment of a CVDD that may be implemented as an 8-pin integrated circuit.

FIG. 3 is a schematic depiction of an alternate embodiment of a CVDD that may be implemented as an 8-pin integrated circuit 300. It will be appreciated that the embodiment depicted in FIG. 3 is presented by way of example, and not by limitation. Again, only pertinent portions of circuit 300 will be explained in detail. Referring to FIG. 3, circuit 300 includes a boost DC/DC converter comprising a switch 320 and a first oscillator 330, and a buck DC/DC converter comprising a switch 318 and a second oscillator 340, and a control module 350. Optionally, circuit 300 may also include a power on reset (POR) module for generating a POR signal.

Circuit 300 is connected to power supply line 302 through line 304. The switch 320 is connected between the inductor 312 and ground and is controlled by the first oscillator 330 through line 332. The switch 318 is connected between the inductor 312 and the storage capacitor 316 and is controlled by the second oscillator 340.

Control module 350 executes the logic to determine whether to enable and/or disable the first oscillator 330 and second oscillator 340. Line 352 connects control module to second oscillator 340 and line 354 connects control module 350 to oscillator 330. Power on reset (POR) may generate a POR signal for one or more second circuits connected to circuit 300. The control module also initializes oscillators 330 and 340 so that switches 318 and 320 default to the open position.

In operation, power is supplied on line 302 at a first voltage level. Switches 320 and 318 remain open when their respective oscillator is inhibited (i.e., not enabled). Control module 350 determines that capacitor, 316 below its target voltage by comparing the voltage on line 334 to an internal reference within control module 350. Additionally, as long as the reference voltage at Vsense as set by external resistor 322 exceeds another internal reference within control module 350, the Control Module generates a signal to activate first oscillator 330 which alternately closes and opens switch 320. When switch 320 is closed, current flows from line 302 to line 304 through inductor 312 then through switch 320 to ground. When the switch is opened, the path to ground is interrupted, and the voltage across the inductor 312 rises in an attempt to maintain the current. As the voltage on line 306 exceeds the voltage at the storage capacitor 316 (plus a diode drop) the diode 314 conducts current through a limiting resistor 308 to charge the storage capacitor 316 to a second voltage level, higher than the first voltage level. When control module 350 senses that the storage capacitor has either achieved its preset voltage through line 334, or the reference voltage at Vsense falls below its target level, it disables oscillator 330, leaving switch 320 in the open position.

Control circuit 350 monitors the voltage on line 304, through the voltage divider connected to Vsense, and if the voltage falls beneath a predetermined threshold as set by the external resistor 322, then control circuit 350 deactivates first oscillator 330 and activates second oscillator 340 which alternately closes and opens switch 318 to drain power from capacitor 316. Second oscillator 340 alters it duty cycle in order to maintain the output at a third voltage level to line 304 marginally lower than the first voltage level. Inductor 312 acts as both an energy storage device and low-pass filter in combination with the external capacitor (322 [attached from line 302 to ground]) to smooth the output to line 304. During this discharge condition, the voltage present at Vsense remains below the threshold voltage needed to disable Oscillator 340 and re-enable Oscillator 330. Output ceases when the storage capacitor 316 is drained below the level that the oscillator 340 can maintain the third output voltage.

Thus, circuits 200 and 300 provide a temporary, uninterruptible power supply that may be used to provide power to a second circuit in the event of a failure from the main power supply. Circuits 200 and 300 may find application in a wide variety of electronic devices. Exemplary applications include: (1) security devices that issue a self-destruct sequence upon loss of power, such as in a financial transaction terminal; (2) integrated circuit-based battery death logger or detector; (3) a catastrophic failure alarm; (4) an instantaneous brown-out compensation device; (5) a processor interrupt and reserve power for emergency data storing; (6) a battery replacement for information backup (i.e., battery+RAM can be replaced by CVDD+flash memory) in areas where battery use is discouraged such as medical applications; (7) an air Bag trigger for total loss of power to automobile; and (8) a remote monitoring of interrupted power through a broadcast channel.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A constant voltage discharge device for coupling between a power source and a power supply of an electronic circuit, the device comprising:
   an input;
   an output;
   a storage capacitor;
   a first DC/DC voltage converter that receives an input current at a first voltage level and generates an output current at a second voltage level to charge the storage capacitor;
   a second DC/DC voltage converter to discharge the storage capacitor and decrease the output voltage level at the output below the second voltage level to provide temporary power to the power supply of the electronic circuit when power between the power source and the power supply is interrupted; and
   a feedback circuit operatively coupled between the second DC/DC voltage converter and the output to monitor power between the power source and the power supply via the output,
   such that, when the input power fails or shorts, the first DC/DC voltage converter turns off, and the second DC/DC voltage converter switches on, draining the storage capacitor to generate the output voltage.

2. The constant voltage discharge device of claim 1, wherein the feedback circuit comprises:
   first and second resistors series operatively coupled between the output and a reference voltage; and
   a feedback path operatively coupled between the first and second resistors to provide a sampled voltage from between the first and second resistors to the second DC/DC voltage converter.

3. The constant voltage discharge device of claim 1, wherein the second DC/DC voltage converter decreases the output voltage level at the output below the first voltage level to provide temporary power to the power supply of the electronic circuit.

4. The constant voltage discharge device of claim 1, further comprising a second feedback circuit operatively coupled to the first DC/DC voltage converter to monitor power across the storage capacitor.

5. The constant voltage discharge device of claim 1, further comprising a current-limiting resistor operatively coupled between the first DC/DC voltage converter and the storage capacitor.

6. A circuit for providing temporary power to a power supply of an electronic circuit when power between a power source and the power supply is interrupted, the circuit comprising:
    an input;
    an output;
    a storage capacitor;
    a first DC/DC voltage converter that receives an input current at a first voltage level at the input and generates an output current at a second voltage level to charge the storage capacitor;
    a current-limiting resistor operatively coupled between the first DC/DC voltage converter and the storage capacitor;
    a feedback loop to monitor power between the power source and the power supply; and
    a second DC/DC voltage converter to discharge the storage capacitor and decrease the output voltage level below the second voltage level to provide temporary power to the power supply of the electronic circuit;
    the feedback loop comprising
    first and second resistors series operatively coupled between the output and a reference voltage, and
    a feedback path operatively coupled between the first and second resistors to provide a sampled voltage from between the first and second resistors to the second DC/DC voltage converter
    such that, when the input power fails or shorts, the first DC/DC voltage converter turns off, and the second DC/DC voltage converter switches on, draining the storage capacitor to generate the output voltage.

7. The constant voltage discharge device of claim 6, wherein the second DC/DC voltage converter decreases the output voltage level at the output below the first voltage level to provide temporary power to the power supply of the electronic circuit.

8. The constant voltage discharge device of claim 6, further comprising a second feedback circuit operatively coupled to the first DC/DC voltage converter to monitor a voltage of the storage capacitor.

9. A method for supplying a temporary power to a power supply of an electronic circuit when power between a power source and the power supply is interrupted, the method comprising:
    receiving an input current at a first voltage level from the power source and generating an output current at a second voltage level with a first DC/DC voltage converter to charge a storage capacitor;
    monitoring power between the power source and the power supply;
    discharging the storage capacitor and decreasing the output voltage level at the output below the second voltage level with a second DC/DC voltage converter to provide temporary power to the power supply of the electronic circuit when power between the power source and the power supply decreases below a threshold; and
    when the input power fails or shorts, turning off the first DC/DC voltage converter, switching on the second DC/DC voltage converter, and draining the storage capacitor to generate the output voltage.

10. The method of claim 9, wherein monitoring comprises providing a feedback circuit including:
    first and second resistors series operatively coupled between the power and a reference voltage; and
    a feedback path operatively coupled between the first and second resistors to provide a sampled voltage from between the first and second resistors to the second DC/DC voltage converter.

11. The method of claim 9, wherein the second DC/DC voltage converter decreases the output voltage level at the output below the first voltage level to provide temporary power to the power supply of the electronic circuit.

12. The method of claim 9, further comprising operatively coupling a second feedback circuit to the first DC/DC voltage converter to monitor a voltage of the storage capacitor.

13. The method of claim 9, further comprising operatively coupling a current-limiting resistor between the first DC/DC voltage converter and the storage capacitor.

* * * * *